Feb. 7, 1961  J. J. FANNEN  2,970,346
HEATING UNIT MOUNT FOR A TIRE MOLD MATRIX
Filed March 23, 1959  3 Sheets-Sheet 1
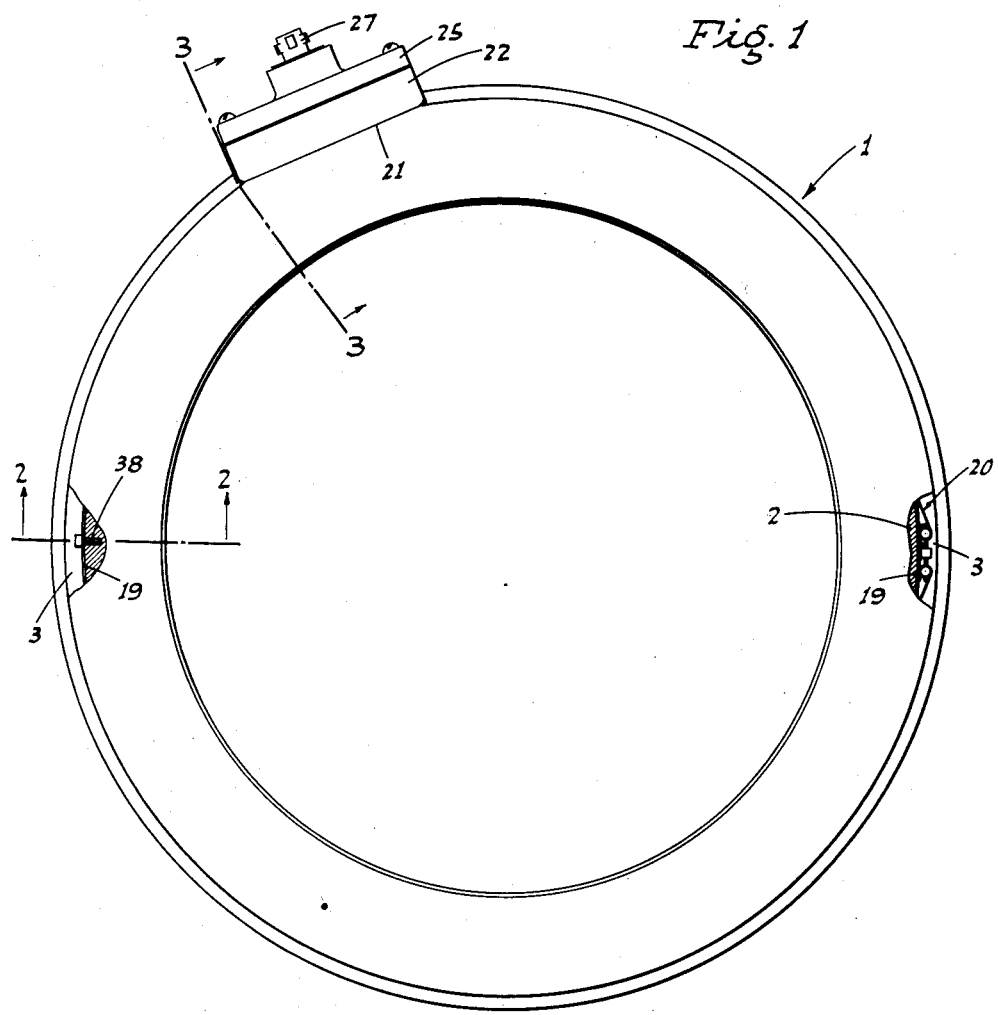
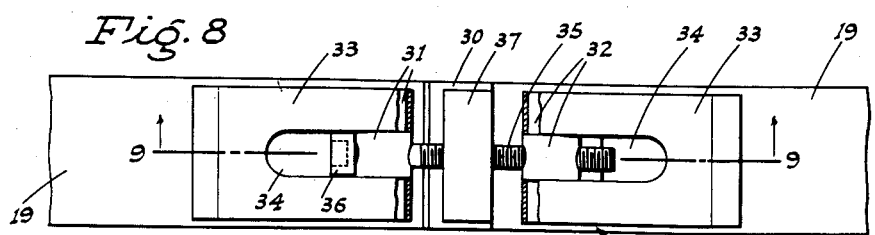
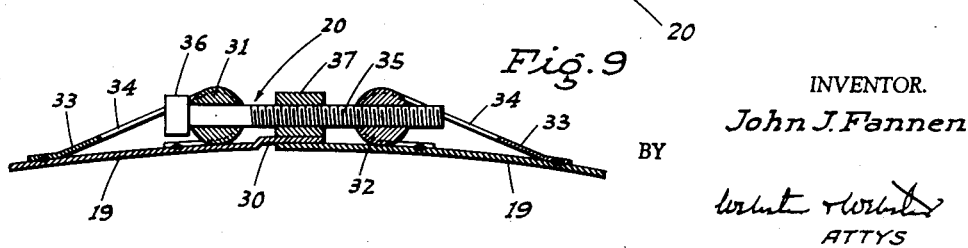
INVENTOR.
John J. Fannen
BY
ATTYS

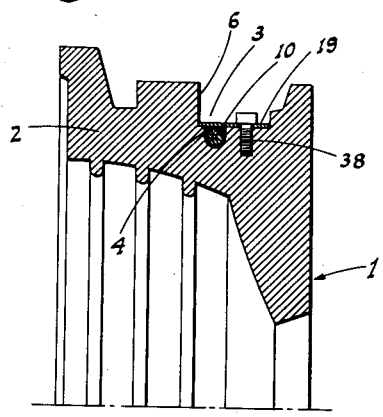
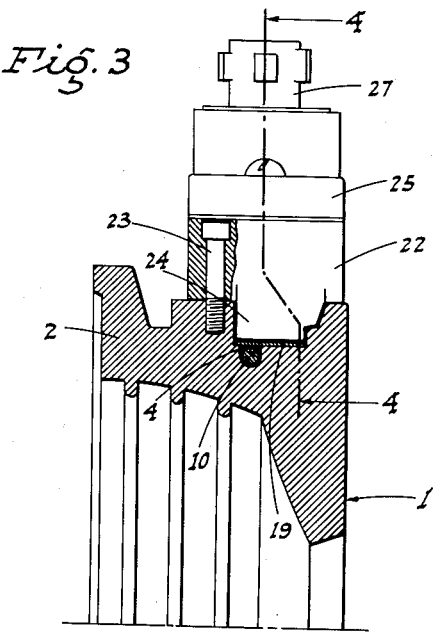
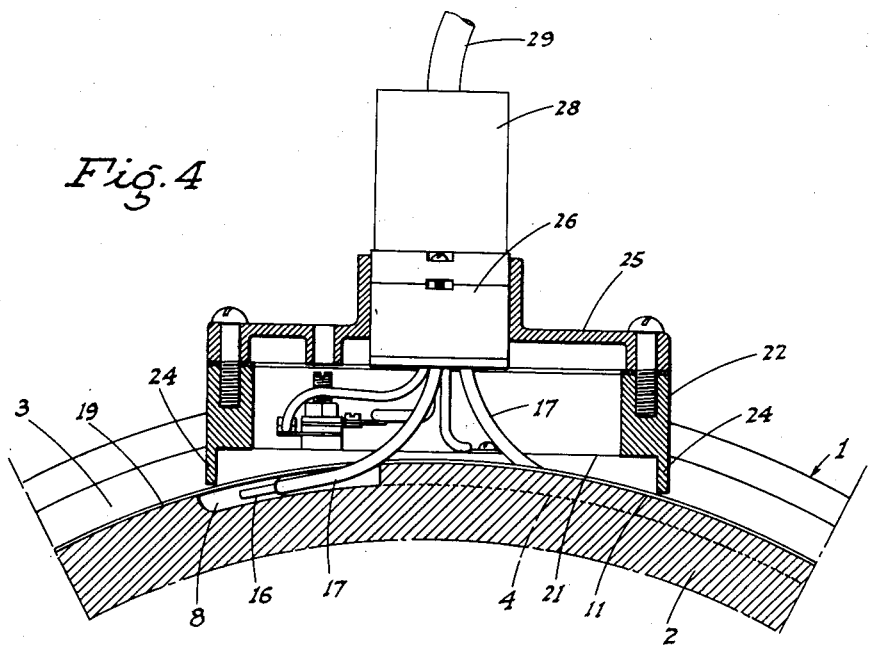

Feb. 7, 1961  J. J. FANNEN  2,970,346
HEATING UNIT MOUNT FOR A TIRE MOLD MATRIX
Filed March 23, 1959  3 Sheets-Sheet 3
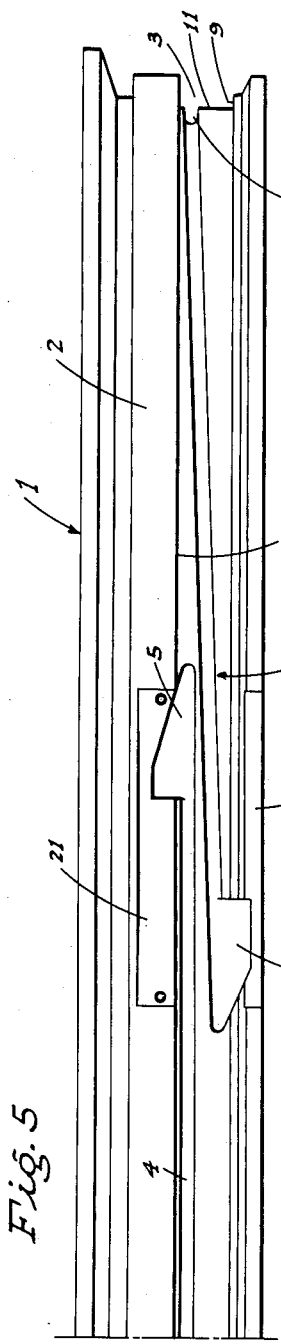
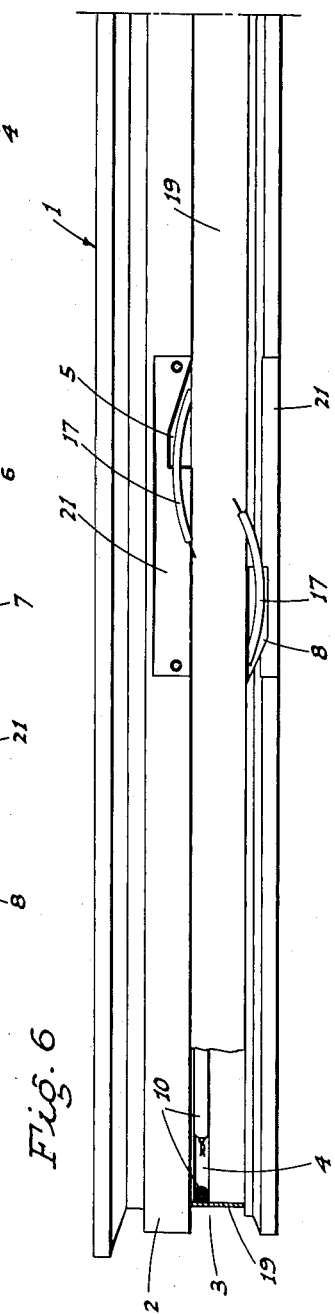
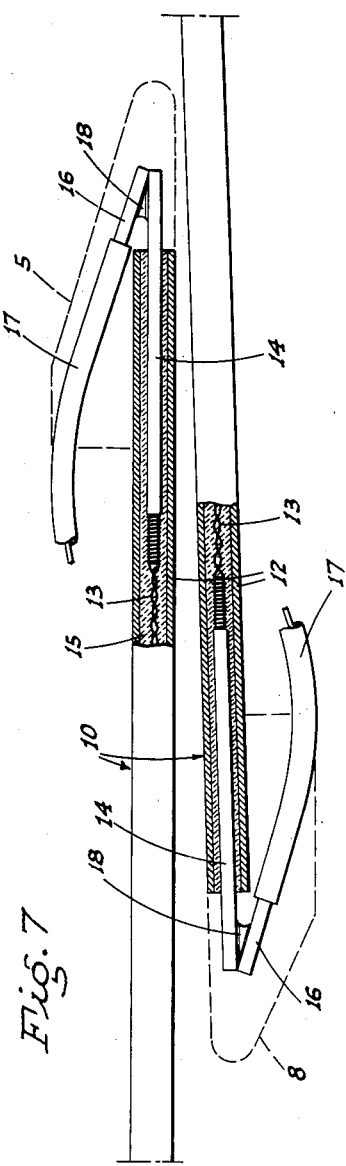
INVENTOR.
John J. Fannen
BY
ATTYS

United States Patent Office 2,970,346
Patented Feb. 7, 1961

2,970,346

HEATING UNIT MOUNT FOR A TIRE MOLD MATRIX

John J. Fannen, Lodi, Calif., assignor to Super Mold Corporation of California, Lodi, Calif., a corporation of California Filed Mar. 23, 1959, Ser. No. 801,175

1 Claim. (Cl. 18—38)

This invention relates to an electrically heated, full-circle, tire-mold matrix, and particularly represents improvements over the structure shown in United States Patent No. 2,801,443, dated August 6, 1957, in the name of Arnold Duerksen.

In the structure of the present invention, a standard type of separated-end, elongated, tubular heating unit is employed; such unit including a sheath or housing, a heating element therein which terminates short of the ends of the housing, and conductor but non-heating rods connected to the ends of the heating element and projecting from the ends of the housing.

The major object of this invention is to so mount the heating unit on the matrix that the ends of the heating element, rather than the ends of the housing, will terminate immediately adjacent each other in the circumferential plane of the matrix. In this manner the matrix is heated evenly for its entire circumferential extent, and relatively hot or cold spots—caused by circumferential overlapping or spacing apart, respectively, of the ends of the heating element—and which are detrimental to a proper and efficient vulcanizing operation, are avoided.

Another object of this invention is to provide a means—in the form of a removable clamping or retaining band—which presses the housing of the heating unit firmly, and for its entire extent, against the matrix body so that maximum heat transfer is obtained.

Terminal wires are connected to projecting ends of connector rods of the heating unit, and the housing of the unit is seated in a groove formed in the matrix body under the retaining band; a further object of the invention being to provide pockets in the matrix body arranged in communication with the groove and relative to the retaining band in such a manner that said terminal wires are exposed clear of the band, without disturbing the latter, for ready connection to a control box mounted on the matrix body over the pockets and the adjacent portion of the band.

It is also an object of the invention to provide a heating unit mount for a tire mold matrix which is designed for ease and economy of manufacture.

Still another object of the invention is to provide a practical, reliable and durable heating unit mount for a tire mold matrix, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of a matrix, partly broken away and in section, equipped with the heating unit.

Fig. 2 is an enlarged fragmentary radial cross section of the matrix, taken on line 2—2 of Fig. 1.

Fig. 3 is a similar view on line 3—3 of Fig. 1.

Fig. 4 is a fragmentary circumferential section, taken substantially on line 4—4 of Fig. 3.

Fig. 5 is a fragmentary edge view of the matrix, prior to the mounting of the heating unit therein.

Fig. 6 is a similar view, showing the heating unit as in place in the matrix, but prior to the mounting of the control box thereon.

Fig. 7 is a fragmentary enlarged view, partly broken out and in section, of the end portions of the tubular heating unit as if mounted in place in the matrix, showing particularly the relation of the ends of the heating element to each other when so mounted.

Fig. 8 is an enlarged plan view of the securing clamp for the ends of the cover band for the heating unit, showing such clamp as fastened but with the band detached from the matrix.

Fig. 9 is a longitudinal section of the clamp and adjacent portions of the band, taken along line 9—9 of Fig. 8.

Referring now more particularly to the drawings, and to the characters of reference marked thereon, the matrix 1, which comprises one half of a band-type tire retreading mold, is—as usual—a full-circle member having a radially thick body 2 formed with an endless circumferential channel 3 open to the outer periphery of said member and disposed relatively close to the laterally outer side thereof.

Cut in the bottom of the channel 3 is a circumferentially extending groove 4 having, however, separated ends. For the major portion of its extent the groove 4 lies near and parallel to the laterally inner edge of the channel 3, as shown in Figs. 2, 3, and 5 for example, and at one end of said parallel portion the groove 4 opens into an enlarged pocket 5. The bottom of the pocket 5 is flush with the bottom of the groove 4, as indicated in Fig. 4; the enlargement of said pocket relative to the width of the groove being in a direction laterally inward of the matrix member 1 from the groove, so that a portion of the pocket cuts through the laterally inner wall 6 of the channel and extends into said member laterally inward from the channel. The pocket is thus open both to the bottom of the channel 3 and to the radially outer periphery of the matrix member. The purpose of this specific pocket arrangement will be seen later.

The other end portion of groove 4 diverges laterally out in the channel 3, as shown at 7 in Fig. 5, and for a short distance extends beyond and clear of pocket 5 to a termination in an enlarged pocket 8. This pocket is of the same general configuration and relationship to the corresponding end of the groove 4 as said pocket 5. The enlargement of pocket 8 however is in a direction laterally outward of the matrix member 1, and cuts through the laterally outer wall 9 of the channel 3 so that a portion at least of said pocket 8 is disposed laterally out from said channel.

The groove 4 is of a size to snugly receive a tubular separated-end electric heating unit 10 of conventional form, with the periphery of said unit flush with the bottom wall 11 of the channel 3.

The heating unit 10 comprises a flexible metallic tubular housing 12 in which the heating element 13 is disposed. The element 13 terminates in the housing 12 short of the ends thereof, and is connected to pins 14 of a material having good electrical conductivity but which is a poor conductor of heat, such as copper; said pins projecting from the ends of said housing a short distance. The element 13 and pins 14 are set as usual in refractory material 15.

The heating unit 10 is of a length such that when mounted in the groove 4 the actual ends of the element 13 are disposed in close relation to each other, as shown in Fig. 7, while the ends of the housing 12 and the exposed portions of the pins 14 project into the pockets 5 and 8, as illustrated. This arrangement of the end portions of the heating unit 10 relative to each other is of great importance in obtaining the necessary even heating of the matrix throughout its extent. This is for the reason that it has been found that any appreciable circumferential spacing of the ends of the heating element away from each other leaves a relatively cold zone in the matrix which would detrimentally affect the tread-vulcanization of a tire embraced by said matrix.

On the other hand, any appreciable overlap of the ends of the heating element creates an excessively hot zone in the matrix, which is also detrimental to proper vulcanization.

The exposed ends of the connector pins 16 of short lengths of terminal wire 17 are rigidly secured, as by welding 18, to the exposed ends of the connector pins 14 of the heating unit 10 in such a manner that said wires will project back from the respective pins 14 in the portions of the corresponding pockets 5 and 8 which are laterally offset from the groove 3 and said unit 10, as shown in Fig. 7.

This arrangement enables a clamping band 19, the full width of channel 3, to be placed in said channel after the heating unit 10 is disposed therein, whereby to hold said unit against any outward movement radially of the matrix, while leaving the entire length of the connecting wires 17 exposed and unobstructed by the band 19, as shown in Fig. 6. Said band, which necessarily has ends separate from each other, is provided at said ends with a reasable connecting unit, indicated generally at 20 (see Figs. 8 and 9) and which will be described in detail hereinafter.

Where the heating unit ends overlap, the periphery of the matrix body 2 to the sides of the channel 3 is flat-cut, as at 21, to provide a flat seat for the bottom edges of the sidewalls of an open-bottomed control box 22; said sidewalls straddling not only the channel 3, but also the laterally projecting portions of the pockets 5 and 8, and which portions the box encloses.

The control box 22 is secured on the matrix by screws, one of which is shown at 23, projecting through the box adjacent its ends and into the matrix body laterally in from the channel, as shown in Fig. 3. The end walls of the box are formed with skirts 24 which depend into the channel 3 in substantially matching relation.

The box 22 includes a removable cover 25, which makes it easier than would otherwise be the case to connect the wires 17, and any others which may be necessary, to the terminal block 26 which is mounted in the box, and which at its outer end is provided with a plug 27 adapted for detachable connection with a socket 28 on the end of a current supply cable 29.

The band 19 is not only for the purpose of preventing radial outward movement of the heating unit 10 from the groove 4, but also maintains such unit in firm contact with the bottom of the groove, since it is at this point that the most efficient heat transfer is obtained. To this end, the band 19 is made of a certain grade of stainless steel, which adequately compensates for any expansion and contraction of the heating unit and matrix, and—with the aid of the clamping unit 20—functions to give the desired result.

The band 19 is formed at one end with a short portion 30 which is offset relative to and overlaps the other end of the band, as shown in Fig. 9.

The clamp 20 comprises a pair of cross pins 31 and 32 extending transversely of the band on the outside and spaced back a short distance from the overlap. Each pin is turnably mounted in a strap 33, which partially wraps about the pin, and the ends of which strap are spot-welded to the band. Each strap is formed with a longitudinal central gap 34 which embraces the corresponding pin; the latter being enlarged for the width of the gap so that said pin cannot shift axially.

A headed screw 35 slidably and turnably projects through the pin 31 within the gap, and is threaded through the other pin 32; the head 36 of the screw bearing against the pin 31 on the side thereof opposite pin 32.

Between the cross pins the screw is threaded through a transverse pressure pad 37 which is positioned to bear down firmly on the overlap 30 of the band. This arrangement insures even pressure of the band on the heating unit for substantially the entire circumferential extent thereof, as is desired.

In order that the clamp 20 shall be located at a point in the circumference of the matrix spaced from the control box 22, a band-locating screw 38 (see Figs. 1 and 2) projects through the band and into the matrix at the bottom of the channel 3 and in laterally offset relation to the groove 4.

From the foregoing description it will be readily seen that there has been produced such a device as will substantially fulfill the objects of the invention as set forth herein.

While this specification sets forth in detail the present and preferred construction of the device, still in practice such deviations therefrom may be resorted to as do not form a departure from the spirit of the invention, as defined by the appended claim.

Having thus described the invention, the following is claimed as new and useful, and upon which Letters Patent are desired:

In a tire vulcanizing matrix having a circular tire embracing body, an electric heating unit having separated ends surrounding the body in engagement therewith, and including a housing and a heating element therein, a circumferential endless channel formed in the outer periphery of the body, there being a groove in the bottom of the channel to receive the housing of the heating unit, flexible terminal wires connected at one end to and projecting from the heating unit, enlarged pockets open to the periphery of the body and to which the groove at its ends opens; said pockets projecting away from each other laterally of the body and the connected ends of the wires being disposed in the pockets, a retaining band seated in the channel over the heating unit; the pockets projecting laterally beyond the band whereby the outer portions of the terminal wire may extend substantially radially out from the body without disturbing the band.

References Cited in the file of this patent

UNITED STATES PATENTS

| | | |
|---|---|---|
| 1,435,392 | Heiser | Nov. 14, 1922 |
| 2,729,851 | Hawkinson | Jan. 10, 1956 |
| 2,801,443 | Duerksen | Aug. 6, 1957 |
| 2,932,853 | Fike | Apr. 19, 1960 |